United States Patent
Bonaquist et al.

[19]

[11] Patent Number: 5,888,265
[45] Date of Patent: Mar. 30, 1999

[54] AIR SEPARATION FLOAT GLASS SYSTEM

[75] Inventors: Dante Patrick Bonaquist, Grand Island; Joseph Alfred Weber, Cheektowaga; Theodore Fringelin Fisher, Amherst, all of N.Y.

[73] Assignee: Praxair Technology, Inc., Danbury, Conn.

[21] Appl. No.: 995,878

[22] Filed: Dec. 22, 1997

[51] Int. Cl.⁶ .................................................. C03B 18/20
[52] U.S. Cl. ............................. 65/157; 65/32.5; 65/99.2; 65/99.4; 65/182.3
[58] Field of Search .................... 65/32.1, 32.5, 65/99.2, 99.4, 157, 182.3

[56] References Cited

U.S. PATENT DOCUMENTS

| | | | |
|---|---|---|---|
| 3,356,476 | 12/1967 | Gulotta | 65/27 |
| 3,630,701 | 12/1971 | Javaux et al. | 65/27 |
| 4,406,682 | 9/1983 | Ernsberger | 65/99.4 |
| 5,165,244 | 11/1992 | Kleinberg et al. | 62/24 |
| 5,226,932 | 7/1993 | Prasad | 55/16 |
| 5,536,299 | 7/1996 | Girard et al. | 95/101 |
| 5,611,682 | 3/1997 | Slavejkov et al. | 431/8 |
| 5,664,438 | 9/1997 | Bonaquist et al. | 62/645 |
| 5,678,427 | 10/1997 | Bonaquist et al. | 62/650 |

*Primary Examiner*—Stanley S. Silverman
*Assistant Examiner*—Sean Vincent
*Attorney, Agent, or Firm*—Stanley Ktorides

[57] ABSTRACT

A cryogenic air separation plant or a combined pressure swing adsorption plant and membrane separation plant is integrated with a float glass manufacturing system wherein oxygen from the plant is used for oxy-fuel combustion in the melt furnace and nitrogen from the plant is used as a protective atmosphere in the float glass forming chamber.

4 Claims, 2 Drawing Sheets

AIR SEPARATION FLOAT GLASS SYSTEM

TECHNICAL FIELD

This invention relates generally to air separation plants and to float glass manufacturing. In the practice of the invention, a cryogenic air separation plant or a combination of a pressure swing adsorption plant and a membrane separation plant is integrated with the float glass manufacturing system.

BACKGROUND ART

The production of flat sheet glass by the float glass process involves the melting of glass in a melt furnace and the transfer of the molten glass from the melt furnace to a float glass forming chamber. There the molten glass is poured onto a bath of molten tin within the float glass forming chamber. To prevent the surface of the hot tin from oxidizing, an atmosphere of nitrogen is used in the float glass forming chamber. The atmosphere also contains hydrogen which reacts with any oxygen which is present to form water vapor, and with sulfur generated from the glass to form hydrogen sulfide. This further ensures the integrity of the hot tin and the molten glass within the float glass forming chamber.

In the making of glass a very large amount of heat is needed to melt the glassmaking materials as they are processed in a glassmelting furnace. Generally this heat is provided by the combustion of fuel and oxidant which has heretofore generally been air.

Nitrogen oxides (NOx) are recognized pollutants and it is desirable to reduce emissions of NOx from industrial processes. NOx is produced in air-based combustion mainly because at the high temperatures of the combustion reaction, nitrogen from the air combines with oxygen.

Recently in response to the NOx problem many industrial processes have begun using pure oxygen or oxygen-enriched air to carry out the combustion as this reduces or completely eliminates the nitrogen brought into the area of the combustion reaction by the oxidant. However, the use of pure oxygen or oxygen-enriched air as the oxidant increases the costs of glassmelting and thus of the entire glass manufacturing system.

Accordingly it is an object of this invention to provide a float glass manufacturing system which employs oxygen as the oxidant for combustion to generate heat for the glassmelting furnace and which operates more efficiently than conventional float glass manufacturing systems.

SUMMARY OF THE INVENTION

The above and other objects, which will become apparent to those skilled in the art upon a reading of this disclosure, are attained by the present invention, one aspect of which is:

A float glass facility comprising:
(A) a melt furnace, a float glass forming chamber and a passage for passing molten glass from the melt furnace into the float glass forming chamber;
(B) a cryogenic air separation plant and means for passing feed air into the cryogenic air separation plant;
(C) means for passing oxygen from the cryogenic air separation plant to the melt furnace;
(D) means for passing nitrogen from the cryogenic air separation plant into the float glass forming chamber; and
(E) a hydrogen supply vessel and means for passing hydrogen from the hydrogen supply vessel into the float glass forming chamber.

Another aspect of this invention is:
A float glass facility comprising:
(A) a melt furnace, a float glass forming chamber, and a passage for passing molten glass from the melt furnace into the float glass forming chamber;
(B) a pressure swing adsorption plant, means for passing feed air into the pressure swing adsorption plant, and means for passing oxygen from the pressure swing adsorption plant to the melt furnace;
(C) a membrane separation plant, a deoxo unit, means for passing feed air into the membrane separation plant, and means for passing nitrogen from the membrane separation plant into the deoxo unit;
(D) a hydrogen supply vessel, means for passing hydrogen from the hydrogen supply vessel into the float glass forming chamber, and means for passing hydrogen from the hydrogen supply vessel into the deoxo unit; and
(E) means for passing nitrogen from the deoxo unit into the float glass forming chamber.

As used herein, the term "feed air" means a mixture comprising primarily oxygen and nitrogen, e.g. ambient air.

As used herein, the term "oxidant" means a fluid having an oxygen concentration of at least 22 mole percent.

As used herein, the term "nitrogen" means a fluid having a nitrogen concentration of at least 95 mole percent.

As used herein, the term "hydrogen" means a fluid having a hydrogen concentration of at least 75 mole percent.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, *The Continuous Distillation Process*.

As used herein, the term "cryogenic air separation plant" means a facility comprising at least one column which processes a feed air input and produces oxygen and nitrogen, and wherein at least some of the processing is carried out at temperatures at or below 150 K. Examples of cryogenic air separation plants which may be used in the practice of this invention may be found in U.S. Pat. No. 5,596,886—Howard, U.S. Pat. No. 5,611,219—Bonaquist, U.S. Pat. No. 5,664,438—Bonaquist et al., U.S. Pat. No. 5,666,824—Bonaquist, and U.S. Pat. No. 5,678,427—Bonaquist et al.

As used herein, the term "pressure swing adsorption plant" means a system which separates gas components from gas mixtures using adsorbents comprising the principal steps of adsorption, during which a specie or species in a mixture is preferentially adsorbed onto adsorbent, and regeneration or desorption, wherein the preferentially adsorbed specie is removed from the adsorbent by a reduction in the pressure. Examples of pressure swing adsorption plants which may be used in the practice of this invention may be found in U.S. Pat. No. 5,415,683—Leavitt, U.S. Pat. No. 5,518,526—Baksh et al. and U.S. Pat. No. 5,536,299—Girard et al.

As used herein, the term "membrane separation plant" means a system which separates gas components from gas mixtures using polymeric membranes and employing gas concentration gradients across the membrane. Examples of membrane separation plants which may be used in the practice of this invention may be found in U.S. Pat. No. 5,226,932—Prasad, U.S. Pat. No. 5,378,263—Prasad and U.S. Pat. No. 5,425,801—Prasad.

As used herein, the term "deoxo unit" means a system which separates oxygen from a gas mixture by catalytic reaction with hydrogen. Examples of deoxo units which may be used in the practice of this invention may be found in U.S. Pat. No. 4,137,056—Golovko and U.S. Pat. No. 4,817,392—Agrawal et al.

DETAILED DESCRIPTION

The invention comprises the integration of a feed air separation system with a float glass facility so that one system supplies both the oxygen used in the melt furnace of the float glass facility, and the nitrogen used in the float glass forming chamber of the float glass facility, thus mitigating the added costs of using oxygen for NOx reduction in the combustion needed to supply heat to the melt furnace.

Figure 1:
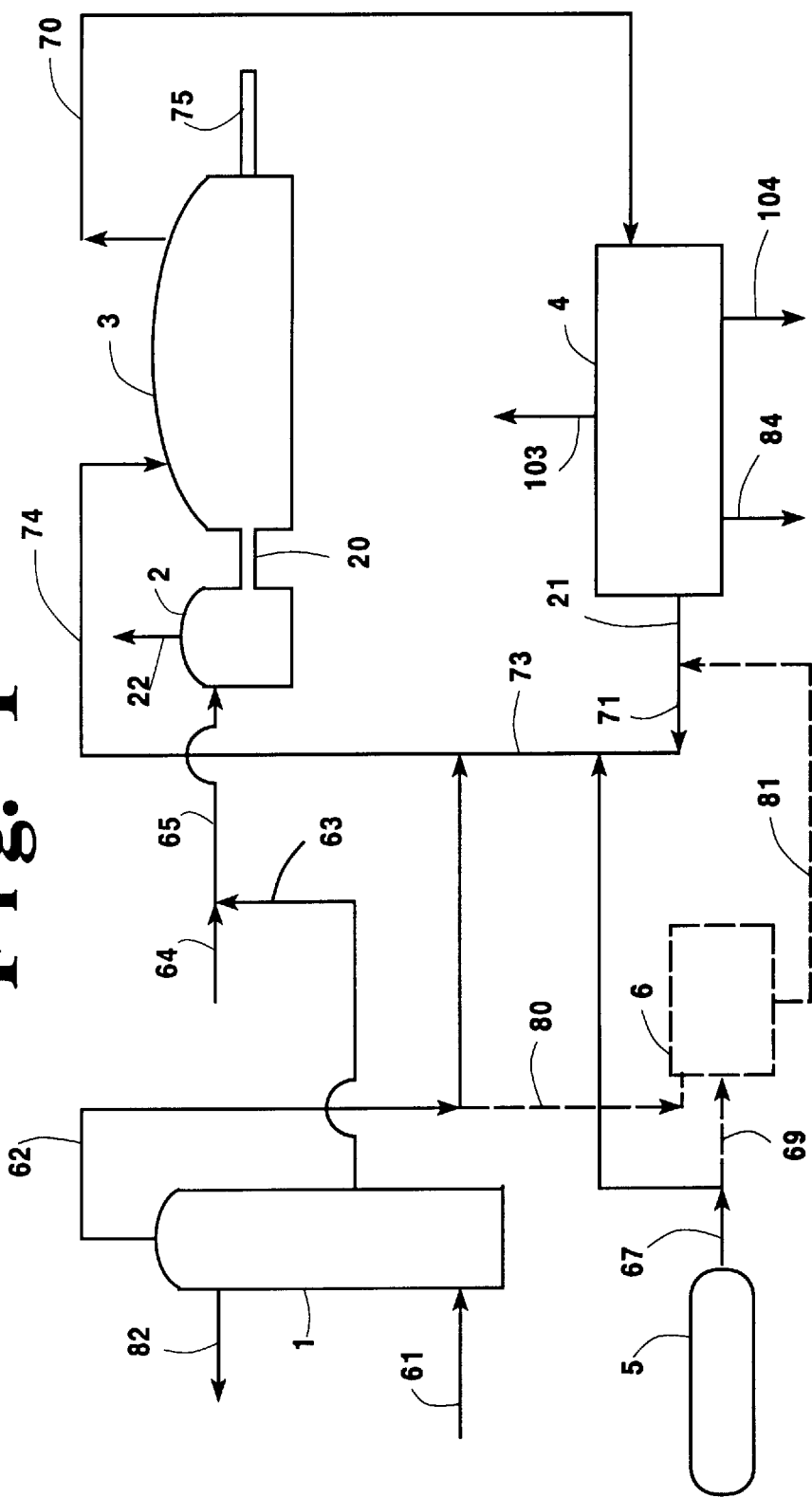
FIG. 1 is a schematic representation of one embodiment of the invention wherein the gas supply to the float glass facility comprises a cryogenic air separation plant.

The invention will be discussed in detail with reference to the Drawings. Referring now to FIG. 1, there is illustrated an embodiment of the float glass manufacturing facility of this invention. The facility illustrated in FIG. 1 comprises a melt furnace 2 and a float glass forming chamber 3 with a passage 20 communicating with furnace 2 and chamber 3 wherein molten glass may pass from furnace 2 to chamber 3. Feed air 61 is passed into cryogenic air separation plant 1 wherein the feed air is separated by cryogenic rectification into oxygen and nitrogen as well as into a waste stream 82 which is removed from the plant. Oxygen from the cryogenic air separation plant is passed into melt furnace 2 wherein it combusts with fuel to provide heat to melt glass forming materials in the melt furnace to form molten glass. Preferably the oxygen is a fluid having an oxygen concentration of at least 80 mole percent, most preferably at least 90 mole percent. In the embodiment illustrated in FIG. 1, oxygen 63 from cryogenic air separation plant 1 is combined with fuel 64, such as natural gas, methane and the like, to form combined stream 65 for passage into furnace 2. Alternatively, the oxygen and the fuel may be passed separately into melt furnace 2 for combustion therein. Combustion reaction products, e.g. water vapor and carbon dioxide are withdrawn from furnace 2 in stream 22.

Nitrogen from cryogenic air separation plant 1 is passed into float glass forming chamber 3. Preferably the nitrogen has a nitrogen concentration of at least 99 mole percent, most preferably at least 99.9 mole percent. In the embodiment illustrated in FIG. 1, nitrogen 62 from cryogenic air separation plant 1 is combined with stream 73, which will be more fully described below, to form stream 74 which is passed into chamber 3. Hydrogen from hydrogen supply vessel 5, e.g. a tank or a tube mounted on a tube trailer, is passed into float glass forming chamber 3. In the embodiment illustrated in FIG. 1, hydrogen 67 is combined with stream 71, which will be more fully described below, to form aforesaid stream 73 which forms stream 74 for passage into chamber 3.

In the event the nitrogen produced by cryogenic air separation plant 1 contains a higher concentration of oxygen than is desired, some or all of the nitrogen from plant 1 may be passed in stream 80 to deoxo unit 6. A portion 69 of the hydrogen from supply vessel 5 would also be passed into deoxo unit 6. Within deoxo unit 6 the hydrogen reacts with the oxygen within nitrogen stream 80 to form water which is removed, thus leaving high purity nitrogen which is passed from deoxo unit 6 in stream 81 and combined with stream 21 from purification system 4 to form stream 71 which forms stream 73 and then stream 74 for passage into chamber 3.

The nitrogen/hydrogen protective atmosphere within chamber 3 becomes contaminated with contaminants such as water vapor, hydrogen sulfide, stannous oxide and stannous sulfide. Contaminated atmosphere from float glass forming chamber 3 is withdrawn as gas stream 70 and passed into purification system 4 wherein the contaminants are removed from the gas stream, such as by adsorption onto adsorbent, and passed out of the system as shown by streams 84 and 104. Some of the protective atmosphere is also withdrawn and released in stream 103. The resulting purified nitrogen/hydrogen gas stream 21 from purification system 4 is now ready for recycle to the float glass forming chamber 3 along with fresh nitrogen and hydrogen as previously described. The recycle of the nitrogen integrated with the air separation facility enables the air separation facility to operate at a lower nitrogen to oxygen product ratio, thus improving the operating efficiency of the air separation plant for its use specific to supplying product for use in float glass manufacturing. Float glass product is removed from float glass forming chamber 3 and recovered through door 75.

Figure 2:
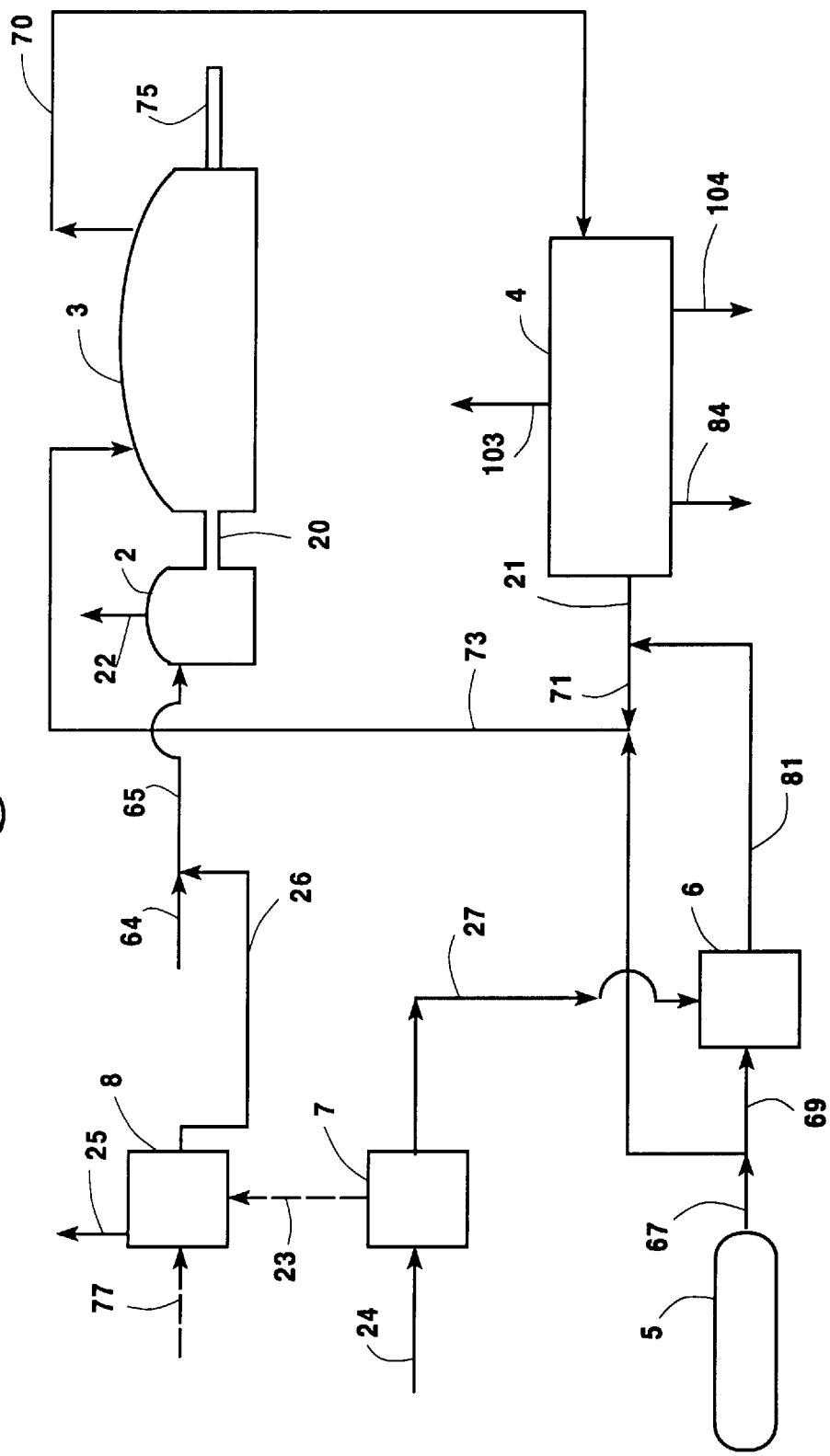
FIG. 2 is a schematic representation of another embodiment of the invention wherein the gas supply to the float gas facility comprises a pressure swing adsorption plant and a membrane separation plant.

FIG. 2 illustrates another embodiment of the float glass manufacturing facility of this invention. The numerals in FIG. 2 correspond to those of FIG. 1 for the common elements and the common elements and operations will not be discussed again in detail. Referring now to FIG. 2, feed air 24 is passed into membrane air separation plant 7 wherein it is separated into nitrogen and into an oxygen/nitrogen residual. The nitrogen/oxygen residual may be passed as feed air from membrane separation plant 7 into pressure swing adsorption plant 8 as stream 23. Alternatively or in addition to stream 23, feed air may be passed into pressure swing adsorption plant in stream 77.

Within pressure swing adsorption plant 8 the feed air is separated by pressure swing adsorption into oxygen and a waste stream 25 which is removed from the plant. Oxygen from the pressure swing adsorption plant is passed into furnace 2 for combustion. In the embodiment illustrated in FIG. 2 oxygen from plant 8 is combined with fuel 64, as in the embodiment illustrated in FIG. 1, prior to passage into furnace 2. Preferably plant 8 is a vacuum pressure swing adsorption plant.

The nitrogen produced in membrane separation plant 7 will generally always contain some oxygen. Therefore, nitrogen from plant 7 is passed in stream 27 into deoxo unit 6. Hydrogen stream 69 is also passed into deoxo unit 6 wherein the oxygen is removed by reaction with the hydrogen to form water, leaving higher purity nitrogen 81 which is processed as previously described. Again, as was the case with the cryogenic air separation plant embodiment, the purification and recycle of nitrogen from the float glass forming chamber enables the air separation to be conducted with a lower nitrogen to oxygen product ratio, enabling more efficient production of oxygen for the oxy-fuel combustion of the melt furnace resulting in a very efficient and advantageous integration of the air separation with the specific usage of the products of the air separation in the practice of this invention.

Now by the use of this invention one can provide a float glass manufacturing facility which uses oxygen rather than air for combustion while still enabling cost efficient operation. Although the invention has been described in detail with reference to certain preferred embodiments, those skilled in the art will recognize that there are other embodiments of the invention within the spirit and the scope of the claims.

We claim:

1. A float glass facility comprising:
   (A) a melt furnace, a float glass forming chamber and a passage for passing molten glass from the melt furnace into the float glass forming chamber;
   (B) a cryogenic air separation plant and means for passing feed air into the cryogenic air separation plant;
   (C) means for passing oxidant from the cryogenic air separation plant to the melt furnace;
   (D) means for passing nitrogen from the cryogenic air separation plant into the float glass forming chamber;
   (E) a hydrogen supply vessel and means for passing hydrogen from the hydrogen supply vessel into the float glass forming chamber; and
   (F) a deoxo unit wherein the means for passing nitrogen from the cryogenic air separation plant includes the deoxo unit, and further comprising means for passing hydrogen from the hydrogen supply vessel to the deoxo unit.

2. The float glass facility of claim 1 further comprising a purification system, means for passing gas from the float glass furnace chamber to the purification system, and means for passing gas from the purification system to the float glass forming chamber.

3. A float glass facility comprising:
   (A) a melt furnace, a float glass forming chamber and a passage for passing molten glass from the melt furnace into the float glass forming chamber;
   (B) a pressure swing adsorption plant, means for passing feed air into the pressure swing adsorption plant, and means for passing oxidant from the pressure swing adsorption plant to the melt furnace;
   (C) a membrane separation plant, a deoxo unit, means for passing feed air into the membrane separation plant, and means for passing nitrogen from the membrane separation plant into the deoxo unit;
   (D) a hydrogen supply vessel, means for passing hydrogen from the hydrogen supply vessel into the float glass forming chamber, and means for passing hydrogen from the hydrogen supply vessel into the deoxo unit; and
   (E) means for passing nitrogen from the deoxo unit into the float glass forming chamber wherein the means for passing feed air into the pressure swing adsorption plant receives a gas comprising oxygen and nitrogen from the membrane separation plant.

4. The float glass facility of claim 3 further comprising a purification system, means for passing gas from the float glass forming chamber to the purification system, and means for passing gas from the purification system to the float glass forming chamber.

* * * * *